Oct. 5, 1937.  G. A. SPELTS  2,094,828
TWO-STROKE CYCLE ENGINE
Filed July 11, 1932   2 Sheets-Sheet 1
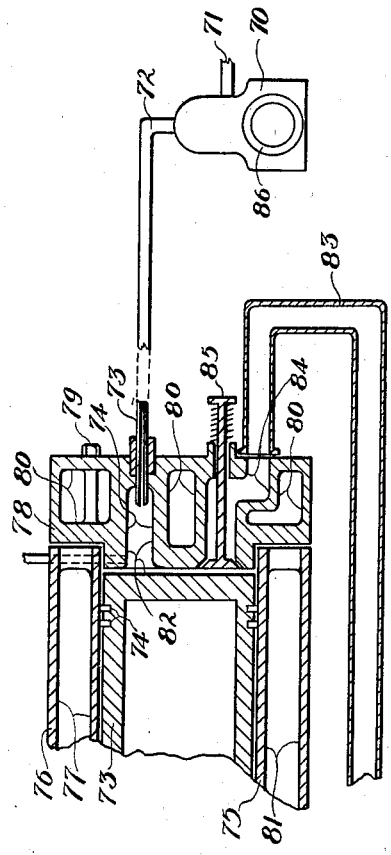
INVENTOR.
G. Allen Spelts

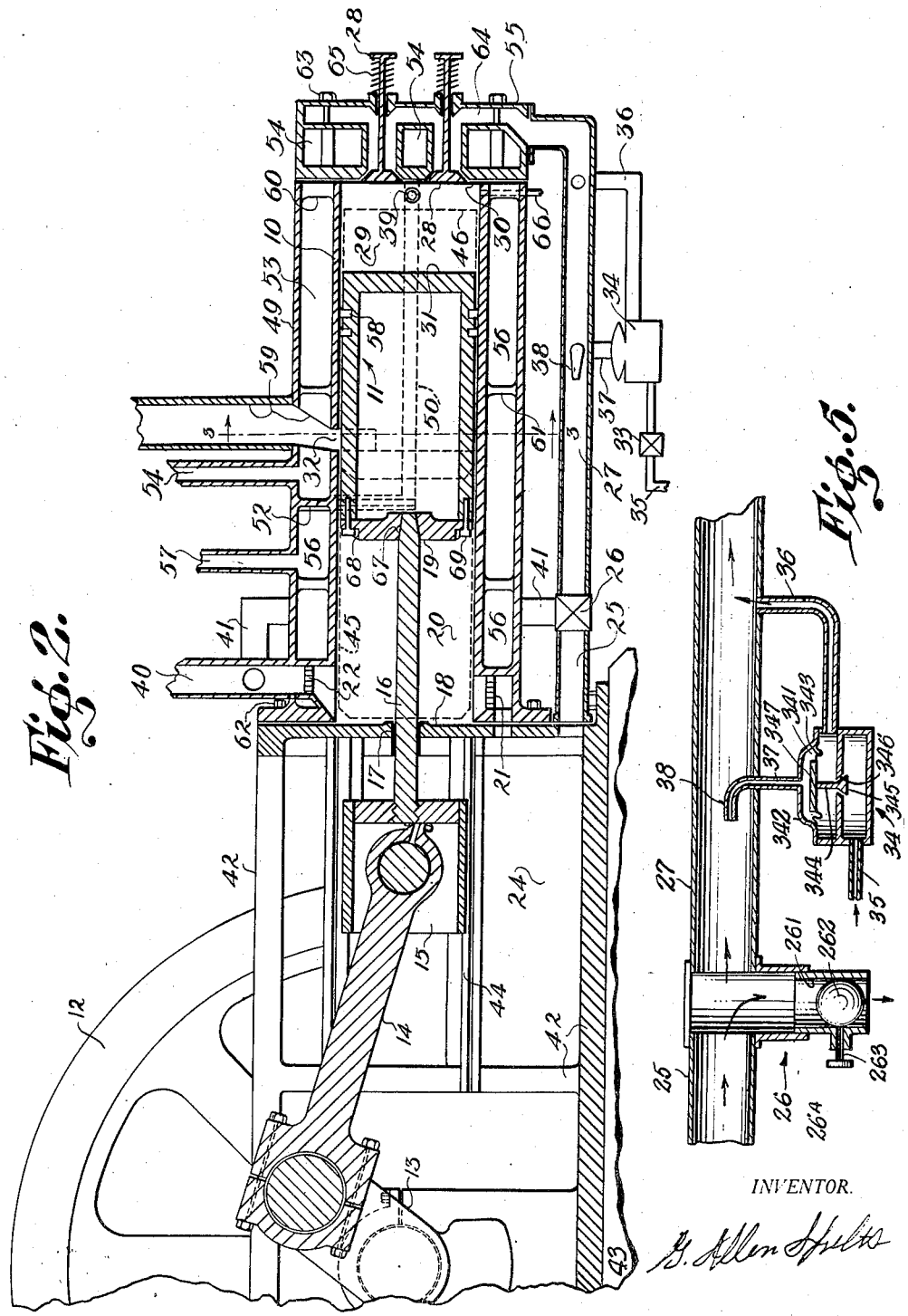

Patented Oct. 5, 1937

2,094,828

UNITED STATES PATENT OFFICE 2,094,828

TWO-STROKE CYCLE ENGINE

George Allen Spelts, Los Angeles, Calif., assignor of seven per cent to W. F. Arndt, and thirty per cent to L. J. Styskal, both of Los Angeles, Calif.

Application July 11, 1932, Serial No. 621,850

20 Claims. (Cl. 123—74)

My invention relates to internal combustion engines in general, and to two stroke cycle engines in particular.

Two stroke cycle engines, or "two-cycle" engines, are well known and are now in general use in pumping stations, oil fields, and many other places where it is highly desirable to keep the space required as small as possible with consistent performance and simplicity of operation.

While the two cycle engine requires less weight and space per unit power, it generally has a considerably lower efficiency than a four cycle engine. This lower efficiency is partly due to incomplete scavenging of the combustion chamber. In order to render this scavenging more complete, the exhaust and intake ports have been designed to exhaust the burned gases with greater facility and to permit the fuel mixture to enter the combustion chamber sooner. These means, were wasteful of fuel, as part of the charge would escape with the exhaust gases. This is particularly true in engines where the intake and exhaust ports are both located near the end of the power stroke. The velocity of the exhausting gases creates a considerable vacuum, and much of the new charge is drawn out through the exhaust port instead of being utilized in the next power stroke.

Another method resorted to was to admit air only at the regular intake port in amounts sufficient to scavenge the combustion chamber, and then admitting the fuel through a valve in the cylinder head after the air intake and exhaust ports were covered by the piston. This procedure complicated the characteristic simplicity of two cycle engines by the necessity for using means for opening the fuel valve at the right moment. The increased efficiency was small due to the fact that an increased power was used to provide the excess air, and to the fact that practically all the excess air was usually blown out through the exhaust port before the closing of the same, as has been described above.

Accordingly, it is an object of my invention to provide a two cycle internal combustion engine of increased efficiency.

Another object of my invention is to provide a means for increasing the efficiency of existing two cycle engines.

It is an important object of my invention to provide a two cycle engine delivering a large increase in power, without resorting to supercharging.

I accomplish these objects by providing means for effectively scavenging the combustion chamber and means for injecting a charge of air and fuel without the loss of part of the air or fuel through the exhaust port.

It is a further object of my invention to provide a two cycle engine utilizing a full charge of air and fuel during each cycle, and without resorting to supercharging.

It is also an object of my invention to provide a two cycle engine accomplishing one or more of the above objects, and being capable of conversion into a Diesel or semi-Diesel engine from an engine requiring electric ignition.

It is still another object of my invention to provide a two cycle engine of greatly increased over-all efficiency and embodying any one or more of the other objects of my invention without complicating the characteristic simplicity of two cycle engines.

My invention possesses many other advantages and has other objects which may be made more easily apparent from a consideration of certain embodiments of my invention. For this purpose I have shown two forms in the drawings accompanying and forming part of the present specification. I shall now proceed to describe these forms in detail, which illustrate the general principles of my invention; but it is to be understood that this description is not to be taken in a limiting sense, since the scope of my invention is best defined by the appended claims.

In the drawings:

Figure 1 represents a schematic diagram illustrating the principles of my invention;

Figure 2 represents a longitudinal section of an engine using electric ignition and embodying the principles of my invention;

Figure 3 represents a cross-sectional view taken as indicated by line 3—3 of Figure 2; and Figure 4 represents a longitudinal section of the upper part of the cylinder and piston, and the cylinder head of a Diesel type engine utilizing my invention. In this figure, I also show diagrammatically the fuel injector (of any well known make) used in conjunction with Diesel engines.

Figure 5 represents an air release valve and a simple diaphragm valve used to reduce gas main pressure to just the right pressure for correct mixture.

Referring particularly to Figure 1, I show a cylinder 10 enclosed at both ends, in which a piston 11 is snugly but slidably fitted. The piston 11 is connected in the usual manner to a flywheel 12 mounted on crankshaft 13 by means of connecting rod 14, crosshead 15, and piston rod 16.

Piston rod 16 passes through air tight bushing or stuffing box 17 in end wall 18 of cylinder 10. End wall 19 of piston 11, cylinder 10, and end wall 18 define a variable space or chamber 20. The check-valves 21 and 22 are exhaust and intake valves respectively.

For explanatory purposes, I assume the flywheel to be revolving in a counterclockwise direction. Then, any air present in the chamber 20 will be compressed and check-valve 21 will be forced open. The air then passes through conduit 23 into totally enclosed tank 24 where it remains until the end of this stroke. The air may then pass through pipe 25, control valve 26, pipe 27, and check- or inlet-valve 28 into the combustion chamber 29. The combustion chamber is defined by cylinder head face 30, cylinder 10, and end wall 31 of piston 11.

During this part of the cycle, combustion is taking place in the combustion chamber. The resulting high pressure urges piston 11 to the left, thus furnishing power to crankshaft 13.

As the piston nears the end of its travel, the exhaust port 32 is uncovered. The burned gases escape through said port, thus lowering the pressure in the combustion chamber. As soon as this pressure reaches a value somewhat lower than that existing in the tank 24 and pipe 27, inlet valve 28 opens and admits air into the combustion chamber.

This air has been mixed with gaseous or vaporized fuel in a manner now to be described. When fuel valve 33 is opened, fuel under pressure enters diaphragm valve 34 through pipe 35. In a well known manner, the pressure of the fuel passing through valve 34 and pipe 36 into pipe 27 is regulated by control pipe 37. Pipe 37 controls the pressure of the fuel in pipe 36 so that it is always a predetermined amount above the pressure in pipe 37. It is clear, then, that when pipe 37 is connected to pipe 27, the fuel delivered into said pipe 27 through valve 34 and pipe 36 is always at a predetermined higher pressure than that existing in pipe 27.

Pipe 37 has a Pitot tube 38 in pipe 27. This is one convenient manner of obtaining the full "head" of the air in the pipe 27. Thus velocity and pressure determine the amount of fuel necessary to form a proper combustible mixture entering the combustion chamber.

The action of diaphragm valve 34 is as follows: Pressure chamber 341 is defined by the upper shell 342 and flexible diaphragm (thin steel, leather, etc.) 343 is connected by means of pipe 37 and Pitot tube 38 to pipe 27. Attached to diaphragm 343 is a shaft 344 having a valve 345 attached thereto. Valve seat 346 cooperates with the valve to regulate the amount of fuel which can pass seat 346 in accordance with movements of the diaphragm. The position of valve 345 is thus seen to depend upon the differential in pressure existing in the pressure chamber and pressure exerted upwardly by the gas below the diaphragm. In this manner, I control the amount of fuel fed into pipe 27. Weights 347 may be used to further regulate the valve. There are many different apparatus obtaining this result, but the fundamental principle of all is the same.

The exhaust gases leave with a high velocity, and create a considerable vacuum which greatly aids the fresh charge in filling the combustion chamber. This fresh charge must traverse the whole length of the combustion chamber before reaching the exhaust port. By proper designing, the piston will, on the return or compression stroke, cover port 32 after practically all burned gases have been exhausted, and just before the new fuel and air mixture has had an opportunity to escape. The inlet valves 28 remain open until the pressure in the combustion chamber is built up to a value somewhat less than that existing in the tank 24, at which point the valve springs 65 (see Figure 2) will close the valve 28. At or near the limit of travel to the right of piston 11, the mixture is ignited by spark plug 39.

Heretofore, great emphasis has been given to the problem of effectively scavenging the combustion chamber without the usually accompanying loss of fuel and air. To this end exhaust and inlet ports have been enlarged to cause a faster exchange of fresh mixture for burnt gases while at the same time the piston head has been shaped to at least partially prevent the new mixture from passing straight across the cylinder and escape through the exhaust port.

The combustion chamber is quite easily scavenged and a new charge injected by my method. By properly proportioning the area of the exhaust ports as well as the degrees of crankshaft travel during which the exhaust ports are uncovered, in conjunction with engine speed, combustion chamber pressure at exhaust point, pressure of incoming mixture, and size of inlet valves and spring pressures, a full new charge can be admitted to the combustion chamber without the loss of part of said charge. A substantially smaller exhaust opening is required than is customarily utilized and in addition the degrees of crankshaft travel during which the piston uncovers the exhaust ports is reduced.

While piston 11 was moving to the right, air entered chamber 20 through check-valve 22.

As is clearly shown in Figures 1 and 2, the piston end wall 19 closely approaches cylinder end wall 18 at the end of a stroke. It is well known that the volumetric efficiency of an air compressor increases with a decrease in clearance at the end of the compression stroke. Accordingly, a full charge of air is entrapped in chamber 20 and that full charge is urged into tank 24 at each compression stroke.

This assures a full charge of air and fuel being forced into combustion chamber 29, since whatever air enters tank 24 must eventually leave the tank through pipe 25. Assuming control valve 26 to be in position to allow passage of air to pipe 27 only, all the air pumped into the tank is forced into the combustion chamber.

The power consumed in delivering a full charge into the combustion chamber in this manner is no greater than the power consumed by an ordinary two cycle engine having a piston open at the pumping end and having a large air chamber or clearance at the extreme (air) compression stroke.

No great pressures are built up since, as has been described above, the partial vacuum created by the exhaust gases aids the introduction of the fresh charge into the combustion chamber.

The size of surge tank 24 partially determines the pressure of air in the tank and conduit 27, since in this tank the air is stored until utilized in the next stroke. The larger the volume of tank and conduit, the smaller the static pressure fluctuates and the lower such pressure is. With a surge tank approximately five times the piston displacement the air pressure averages six to eight pounds per square inch if no air is by-passed to the atmosphere by means of release valve 26.

I do not limit myself to any particular volume of surge tank as a large conduit 26 could perform approximately the same function if large enough. The smaller the storage volume is the higher the air pressure will be and the quicker such pressure will open inlet valves 28 after exhausting starts. The exhaust port may then be made smaller. In faster running engines this quicker opening may be advantageous providing no part of the fresh charge is allowed to escape.

My engine will also operate with the conventional cam-operated intake valve. Such cam-operated valves have the disadvantage of not adjusting the speed of opening and the time during which such valves are open in accordance with load variations. The pressure in the surge tank will generally have no effect upon cam-operated valves. Such cam-operated valves should be adjusted to insure no returning of the charge from the combustion chamber to the conduit 27. Automatic valves adjust themselves to changing conditions.

In spite of this disadvantage, the use of cam-operated valves in conjunction with a positive displacement rear-piston compression means, a surge tank, and check-valves between the surge tank and compression means will result in greatly improved operation over existing engines. In fact, with higher speed engines such as may be used on locomotives, marine engines, tractors, and large trucks it may be desirable to aid quick opening of the valves by cam-operated means.

To control the delivered power of my engine, I provide control valve 26 in pipe 25. By turning valve 26, some of the air passing through pipe 25 is released to the atmosphere. The smaller quantity of air flowing through pipe 27 causes a smaller amount of fuel to be mixed with it by virtue of the operation of diaphragm valve 34, so that a proper mixture of smaller quantity is introduced into the combustion chamber. My method of control is simple and effective.

The action of release valve 26 is as follows: Valve tube 261 cooperates with butterfly valve 262 to provide a variable passage of air from pipe 25 to the atmosphere. Valve 262 is attached to stem 263 which can be turned by such means as wheel 264.

My previous experience has shown me that much of the air used is wasted through the exhaust ports. In previous engines, no full charge could be fed into the combustion chamber except by forcing an excess into the chamber as by a blower such as shown in my previous patent Number 1,396,976, granted November 15, 1921. While such means are an improvement, they are not as efficient as my present means, and they are also more erratic. The efficiency of a blower changes with the speed and load. Consequently, no predetermined amount of air could be introduced into the combustion chamber. My present method feeds a predetermined charge into the combustion chamber, and retains all of the charge therein until said charge is utilized. My engine runs evenly as a consequence.

I wish to stress the importance of the very small clearance existing between the end walls 18 and 19. Previous two cycle engines have been built with a much larger air chamber. Consequently, much of the air is simply being compressed and expanded. In other words, the volumetric efficiency of the air pump used in previous engines is low compared to my pump. A full charge of air equal to the piston displacement is therefore assured during each cycle of operation.

In addition, my method of injecting the air and fuel at or near the cylinder head effectively scavenges the combustion chamber and permits no fuel or air to be wasted, thus causing my engine to fire a full charge during each cycle without resorting to supercharging.

Supercharging has been resorted to in two cycle engines to replace that part of the air or charge lost through the exhaust port. It has been my experience, and that of others, that only a small amount of supercharging is practicable, as much of the extra air or charge is also lost through the exhaust port.

Consequently, my engine performs even better than supercharged two cycle engines for two reasons:

(1) I positively entrap a full charge of air during each cycle instead of only a part thereof.

(2) All of that full charge is utilized—no part of it is lost through the exhaust port.

My engine is therefore highly efficient, both as to fuel consumption per unit work delivered, and as to power delivered per unit size or weight. My engine delivers considerably more power (up to 100% more) than previous engines of the same size. It is also more efficient than a four cycle engine as the charge per cycle is greater due to the greater efficiency of my air pump as compared to the suction stroke of a four cycle engine.

Figure 2 represents a longitudinal cross-section of an engine using the principles of my invention as described in connection with Figure 1. Like numerals denote like parts. End wall 18 is here shown as forming part of frame 42 which in turn rests on suitable base 43. The crosshead 15 slides on guides 44 formed on frame 42.

I have found that the customary manner of connecting the piston rod to the piston at the firing end of the piston is disadvantageous. The large mass of material becomes quite hot and severe expansion and contraction stresses occur. This often results in warping or cracking of the parts unless oil cooling of the piston is resorted to.

To avoid such complication, I have provided a novel piston construction as shown clearly in Figure 2. The rod 16 is tapered at 67, the end plate 19 being joined to the rod as by being shrunk on the tapered portion. Any other suitable means, such as bolting, may be used. The end plate may be bolted to the piston 11 as shown by head bolts 69, the heads of which may be in countersunk recesses 68. The end plate may be fastened to the piston by any other suitable means such as welding.

This construction leaves a uniform mass at the firing end. The end plate 19 being comparatively cool, it is not subjected to the stresses due to high temperatures.

The light broken lines 45 and 46 show the extreme positions of piston 11. Any suitable number of inlet valves 28 may be used, and I have here shown two such valves.

As is shown in Figure 3, exhaust port 32 has several bridges 47 provided with cores 48 for the passage of cooling water. This leaves passages 32' for exhausting the burned fuel.

My engine will naturally develop more heat and an efficient cooling system is provided by water jackets 49 around the cylinder barrel 10, and by two longitudinal ribs 50 and 51 (see Figure 3). These ribs extend from rib 52, formed between jacket 49 and cylinder 10, to the power end of the cylinder, as shown in Figure 2. The rib 52 is formed half way around the barrel 10 and is joined to ribs 50 and 51. Thus, the water entering space 53 through inlet pipe 54 is forced rightwardly around half of the outer surface of the cylinder. All of the water passes through the cores 48, thus cooling bridges 47. The water then passes through spaces 54 in the head 55, leftwardly through space 56 and out through pipe 57. That part of space 56 to the left of rib 52 is cylindrical.

The bridges 47 are necessary to retain rings 58 on the piston when said rings slide past the exhaust port. The bridges are not shown in Figure 2 for the sake of clarity. An exhaust manifold 59, not shown in Figure 3, leads the exhaust gases away from the engine.

The cylinder jacket 49 and cylinder 10 are joined at the ends by bridges 60. Bridges 61 may be used to strengthen the structure. The cylinder and jacket may be joined to the frame 42 as shown at 62. The head 55 may be joined to the cylinder and jacket as shown at 63.

The subject matter of this cooling system has been incorporated in another application for Letters Patent.

The head 55 may have passages 64 leading to valve openings in face 30 of the head. Springs 65 normally close the valves 28 against valve seats in face 30 with a force not sufficient to hold the valves closed against any material higher pressure that may exist in passages 64 than may exist in the combustion chamber.

The principles of my invention may also be used in conjunction with a Diesel engine. Referring to Figure 1 again, I turn valve 26 so that no air is by-passed to the atmosphere; and I also close gas valve 33. I then connect fuel injector 70 of any well known type to the crankshaft of my engine in any suitable manner well known to the Diesel engine art. Fuel enters through pipe 71 and is injected into the combustion chamber 29 through pipe 72 and nozzle 73 at the right instant. In actual practice I, of course, dispense with valve 26, and the fuel feeding means 33—38, and I directly connect pipe 27 to tank 24. It must be remembered that Figure 1 is only a schematic diagram shown for the purpose of clearly explaining the cyclical operation of two cycle engines utilizing my invention.

Referring now to Figure 4, I show the power end of a Diesel engine, the parts not shown being duplicates of the parts shown in Figure 2. I show a piston 73 having rings 74. The piston snugly fits cylinder 75 having a water jacket 76 and a water space 77 therebetween.

The head 78 may be bolted to the cylinder and jacket as shown at 79. The head has water passages 80. Water passes from water space 77, through passages 80, and into passages 81 in a manner similar to the cooling system described in connection with Figure 2.

As shown in Figure 4, the necessary higher compression is obtained by using head 78, which projects into the cylinder 10. However, any other means may be used to secure the high compression, such as using a shorter cylinder.

The air enters the combustion chamber 82 by way of pipe 83, passage 84, and past valve 85. The fuel is injected through nozzle 73 into space 74 forming a part of the combustion chamber. The power delivered by my engine is controlled in the conventional manner by regulating the amount of fuel injected. As is well known, the full charge of air must at all times be injected into the combustion chamber, to secure a pressure and temperature high enough to assure ignition of the fuel.

The same advantages are obtained by my two cycle Diesel engine as by my electric ignition engine. It stands to reason that the principles of my invention could be used with semi-Diesel engines as well as with engines burning powdered fuel injected in definite quantities.

My engine may be started by turning the flywheel by hand or otherwise, or by injecting compressed air into the cylinder as shown diagrammatically at 66 in Figures 2 and 3, and at 87 in Figure 4.

Having described in detail the principles of my invention and two types of engines embodying the same,

I claim:

1. The combination, with one piston having both ends closed, comprising: a cylinder having end walls, the piston, the cylinder, and one end wall defining a combustion chamber, and the piston, the cylinder, and the other end wall defining an air space capable of reduction to a very small volume; inlet and outlet valves in that part of the cylinder defining the air space; means for conducting air from the outlet valve to the combustion chamber, said means including a combustion chamber inlet valve, said valve being operated by a pressure differential in the combustion chamber and the conducting means; means for injecting fuel in proportion to the amount of air used; and means for igniting the fuel in the combustion chamber.

2. In a two stroke cycle engine having rear-piston compression means, the combination comprising a surge tank, a check valve between the surge tank and the compression means, a conduit leading from the surge tank to the combustion chamber, and automatic inlet valves in the cylinder head between the conduit and the combustion chamber.

3. In a two stroke cycle engine having rear piston compression means, the combination comprising a surge tank, a check valve between the surge tank and the compression means, a conduit leading from the surge tank to the combustion chamber, automatic inlet valves in the cylinder head between the conduit and the combustion chamber, and fuel injection means for injecting fuel into the conduit.

4. In a two stroke cycle engine having rear piston compression means, the combination comprising a surge tank, a check valve between the surge tank and the compression means, a conduit leading from the surge tank to the combustion chamber, automatic inlet valves in the cylinder head between the conduit and the combustion chamber, fuel injection means for injecting fuel into the combustion chamber, and means for releasing any amount of the air in the conduit.

5. The combination defined in claim 1, and means for releasing any portion of the air before fuel is mixed with the air.

6. The combination defined in claim 1, and means for releasing any portion of the air before fuel is mixed with the air, the fuel injection means comprising a diaphragm operated valve reducing gas main pressures to pressures proportional to air pressures prevailing in the air conducting means.

7. The combination defined in claim 1, and means for releasing any portion of the air before fuel is mixed with the air, the fuel injection means comprising a differential pressure operated valve reducing gas main pressures to pressures proportional to air pressures prevailing in the air conducting means, said last valve being exposed on one side to air pressures in the air conducting means and to adjustable mechanical pressure means, and being exposed on the other side to the desired gas pressures.

8. The combination defined in claim 3, and means for releasing any portion of the air before mixing with the fuel.

9. The combination defined in claim 3, and means for releasing any portion of the air before mixing with fuel, said means comprising a valve operated in accordance with the power output requirements of the engine.

10. The combination defined in claim 2, and means for injecting fuel into the combustion chamber in proportion to the power output requirements of the engine, said fuel igniting upon entering the combustion chamber.

11. The combination defined in claim 2 and means for injecting fuel into the combustion chamber in proportion to the power output requirements of the engine, the travel of the piston creating a high pressure and temperature near the end of the compression stroke whereby the fuel ignites upon entering the combustion chamber.

12. The combination defined in claim 3, the fuel injection means comprising a diaphragm operated valve reducing gas main pressures to pressures proportional to air pressures prevailing in the conduit, said diaphragm being exposed on one side to conduit pressures and adjustable mechanical pressures and being exposed on the other side to the desired gas pressures.

13. The combination defined in claim 3, means for releasing any portion of the air in accordance with power output requirements before mixing with fuel, the fuel injection means comprising pressure responsive mechanism operating a gas valve to cause gas to flow into the conduit in proportion to the remaining air in the conduit flowing into the combustion chamber.

14. In a two stroke cycle engine having rear-piston compression means, the combination comprising, a surge tank, a check valve between the surge tank and the compression means, inlet valves in the cylinder head and a conduit connecting the surge tank to the combustion chamber of the engine past the inlet valves.

15. In a two stroke cycle engine having rear-piston compression means, the combination comprising a surge tank, a check valve between the surge tank and the compression means, a conduit leading from the surge tank to the combustion chamber, inlet valves in the cylinder head between the conduit and the combustion chamber, and fuel injection means for injecting fuel into the conduit.

16. The combination defined in claim 15 and means for releasing any part of the air before mixing with the fuel.

17. In a two stroke cycle engine having rear-piston compression means, the combination comprising a surge tank forming a transfer means for transferring air from the compression means to the combustion chamber, a check valve between said compressor means and the transfer means, and means for adding fuel to the air between the transfer means and the combustion chamber.

18. The combination defined in claim 17 and means for releasing any part of the air before mixing with the fuel.

19. The combination defined in claim 17 in which the fuel injection means includes a differential pressure operated valve influenced by the air pressure in the transfer means.

20. The combination defined in claim 17 in which the fuel injection means includes a differential pressure operated valve influenced by the air pressure in the transfer means, and means for releasing any part of the air in the transfer means.

GEORGE ALLEN SPELTS.